US007234914B2

(12) United States Patent
Usab, Jr. et al.

(10) Patent No.: US 7,234,914 B2
(45) Date of Patent: Jun. 26, 2007

(54) APPARATUS AND METHOD FOR ENHANCING LIFT PRODUCED BY AN AIRFOIL

(75) Inventors: William J. Usab, Jr., West Windsor, NJ (US); Alan J. Bilanin, Princeton, NJ (US)

(73) Assignee: Continum Dynamics, Inc., Ewing, NJ (US)

( * ) Notice: Subject to any disclaimer, the term of this patent is extended or adjusted under 35 U.S.C. 154(b) by 156 days.

(21) Appl. No.: 10/627,851

(22) Filed: Jul. 25, 2003

(65) Prior Publication Data

US 2004/0197187 A1  Oct. 7, 2004

Related U.S. Application Data

(60) Provisional application No. 60/429,351, filed on Nov. 27, 2002, provisional application No. 60/425,282, filed on Nov. 12, 2002.

(51) Int. Cl.
*F01D 9/04* (2006.01)
*F04D 29/38* (2006.01)
*F04D 29/56* (2006.01)

(52) U.S. Cl. ............... 415/1; 415/68; 415/119; 415/160; 415/161; 415/191; 415/195; 415/914; 416/1; 416/128; 416/129; 416/203

(58) Field of Classification Search ............ 415/1, 415/119, 191, 193, 194, 195, 208.2, 209.1, 415/181, 66, 68, 69, 160–161, 199.4, 199.5, 415/914; 416/1, 128, 129, 175, 203
See application file for complete search history.

(56) References Cited

U.S. PATENT DOCUMENTS 3,058,528 A   10/1962   Hiersch 3,169,747 A   2/1965   Seymour
3,536,417 A   10/1970   Stiefel et al.
3,861,822 A   1/1975   Wanger
3,873,229 A   3/1975   Mikolajczak et al.
4,253,800 A   3/1981   Segawa et al.

(Continued)

FOREIGN PATENT DOCUMENTS

GB   2032048 A   *  4/1980   ............... 415/914

OTHER PUBLICATIONS

Bandyopadhyay, "Maneuvering Hydodynamics of Fish and Small Underwater Vehicles," *Integrative and Comparative Biology*, vol. 42, No. 1, Feb. 2002, pp. 102-117.

(Continued)

*Primary Examiner*—Christopher Verdier
(74) *Attorney, Agent, or Firm*—David M. Quinlan, P.C.

(57) ABSTRACT

A compressor or pump employs principles of unsteady delayed stall to enhance the head increase produced by the compressor or pump. Plural airfoil-shaped lifting elements are spaced from each other in a cascade and the fluid is directed into the cascade by a device that varies a parameter of the flow relative to each lifting element in repeating cycles to cause the flow relative to each lifting element to begin to separate from the lifting element and then reattach thereto during each cycle. The cascade can comprise an axial flow impeller with plural impeller blades arranged around a hub capable of rotating on an axis. The device for varying the flow parameter can be a stator with a plurality of stator blades upstream of the impeller, or a second, counter-rotating axial flow impeller. In either case, the parameter is a flow angle at which the flow is directed to the downstream impeller. The disclosed approach is applicable to any method, and any apparatus that incorporates structure, in which flow is directed to a cascade of lifting elements in a manner whereby the flow relative to each lifting element periodically begins to separate from the lifting element and then reattaches thereto.

19 Claims, 12 Drawing Sheets

U.S. PATENT DOCUMENTS

| | | | |
|---|---|---|---|
| 4,474,534 | A | 10/1984 | Thode |
| 5,078,628 | A | 1/1992 | Garis, Jr. |
| 5,252,875 | A | 10/1993 | Veronesi et al. |
| 5,289,068 | A | 2/1994 | Veronesi et al. |
| 5,368,440 | A | 11/1994 | Japikse et al. |
| 5,588,618 | A | 12/1996 | Marze et al. |
| 5,607,329 | A | 3/1997 | Cho et al. |
| 5,634,611 | A | 6/1997 | Marze et al. |
| 5,634,613 | A | 6/1997 | McCarthy |
| 5,730,580 | A | 3/1998 | Japikse |
| 5,752,672 | A | 5/1998 | McKillip, Jr. |
| 6,345,792 | B2 | 2/2002 | Bilanin et al. |
| 6,439,838 | B1 | 8/2002 | Crall et al. |
| 2005/0106016 | A1* | 5/2005 | Segota et al. ............... 416/1 |

OTHER PUBLICATIONS

Bandyopadhyay et al., "A Biometric Propulsor for Active Noise Control: Experiments". *NUWC-NPT Tech. Rept. 11,351*, NAVSEA Naval Undersea Warfare Center (NUWC) Division, Newport, RI, Mar. 2002, pp. 1-15.

Dickinson et al., "Wing Rotation and the Aerodynamic Basis of Flight," *Science*, vol. 284, Jun. 18, 1999, pp. 1954-1960.

Dickinson, "Solving the Mystery of Insect Flight," *Scientific American*, Jun. 2001, pp. 49-57.

Francis et al., "The Flow Near a Wing Which Starts Suddenly from Rest and Then Stalls," *Rep. Memo Aeronautical Research Comm.*, Aeronautics Laboratory, University of Cambridge, England, Rept. No. 1561, Aug. 8, 1933.

Harris et al., "Rotor High Speed Performance, Theory vs. Test," *J. of Amer. Helicopter Soc.*, vol. 15, No. 3, Apr. 1970, pp. 35-44.

Johnson, "Rotorcraft Aerodynamics Models for a Comprehensive Analysis," *Proc. Amer. Helicopter Soc. 54th Annual Forum*, Washington, DC, May 20-22, 1998, pp. 71-94.

Nguyen et al., "Evaluation of Dynamic Stall Models with UH-60A Airloads Flight Test Data," *Proc. Amer. Helicopter Soc. 54th Annual Forum*, Washington, DC, May 20-22, 1998, pp. 576-588.

Tarzanin, "Prediction of Control Loads Due to Blade Stall," *J. of Amer. Helicopter Soc.*, vol. 17, No. 2, Apr. 1972, pp. 33-46.

Rukavina et al., "Stall Margin Improvement in Axial-Flow Compressors by Circumferential Vaariation of Stationary Blade Setting Angles," *AIAA/SAE/ASME/ASEE 26th Joint Propulsion Conference*, Orlando, FL, Jul. 16-18, 1990, pp. 1-11.

* cited by examiner

FIGURE 1A (at time t)

FIGURE 1B (at time t + τ)

FIGURE 1C (at time t + 2τ)

FIGURE 1D (at time t + 3τ)

FIGURE 1E (at time t + 4τ)

APPARATUS AND METHOD FOR ENHANCING LIFT PRODUCED BY AN AIRFOIL

CROSS-REFERENCE TO RELATED APPLICATIONS

This application claims the benefit of U.S. provisional application No. 60/425,282, filed Nov. 12, 2002, and U.S. provisional application No. 60/429,351, filed Nov. 27, 2002.

BACKGROUND OF THE INVENTION

1. Field of the Invention

The present invention relates to an apparatus and method to enhance lift by cyclically causing the flow over an airfoil to begin to separate from the airfoil and then reattach, and more particularly, to an apparatus and method for increasing the pressure differential created by a rotating impeller.

2. Description of Related Art

Apparatus such as propulsion devices (for example, airplane propellers and marine propulsors), turbomachinery (for example, axial and centrifugal flow compressors), pumps, turbines (axial and centrifugal configurations), and the like, all involve the transfer of energy between a rotating impeller and a working medium fluid. The tools for designing such apparatus have become very sophisticated, using advanced mathematical techniques incorporating complex algorithms requiring the computing capacity of powerful modern computers. But even the most advanced design tools still generally assume steady-state flow conditions. That is, current fluid dynamics design approaches assume that the flow parameters at a given point are constant for any particular set of operating conditions, meaning that at any given location on, say, the blade of a marine propeller operating under a particular set of conditions, the flow parameters do not change over time.

One commentator has put it like this: "In the decades since 1934, engineers and mathematicians have amassed a body of aerodynamic theory sufficient to design Boeing 747s and stealth fighters. As sophisticated as these aircraft may be, their design and function are based on steady-state principles: the flow of air around the wings and the resulting forces generated by that flow are constant over time." Dickinson, "Solving the Mystery of Insect Flight," *Scientific American*, June 2001, pp. 49–57. The same steady-state assumptions are used to design complex propulsion systems such as jet engines. Yet a steady-state fluid dynamics analysis suggests that the seemingly simple way insects propel themselves is actually impossible.

Science has recently come to understand that insect flight in fact involves significant variations over time of the flow field around the insects' wings, caused by complex flapping/rotational wing motion. In other words, understanding insect flight requires non-steady-state analysis. As it turns out, one phenomenon insects take advantage of was observed many years ago. Francis et al., "The Flow Near a Wing Which Starts Suddenly from Rest and then Stalls," *Rep. Memo Aeronautical Research Comm.*, Aeronautics Laboratory, University of Cambridge, England, Rept. No. 1561, Aug. 8, 1933, shows that a wing that starts at an angle of attack in excess of that associated with steady-state stall travels several chord lengths before experiencing flow separation and loss of lift. An insect uses the delayed stall associated with translational wing motion (in addition to taking advantage of lift and wake capture associated with rotational wing motion) in order to fly. Dickinson et al., "Wing Rotation and the Aerodynamic Basis of Flight," *Science*, Vol. 284, Jun. 18, 1999, pp. 1954–60.

The flow over a wing W at the onset of aerodynamic stall is illustrated schematically in FIG. 1. The wing W has a conventional airfoil cross-section, and in normal, level flight the flow stays attached to the top and the bottom of the airfoil. As those skilled in the art understand, when the flow stays attached to the upper and lower airfoil surfaces, the wing generates a lift force L. It is also well known that the magnitude of the lift L is proportional to the airfoil's angle of attack $\alpha$. This is the angle between the vector representing the airfoil's velocity $U_\infty$ through the air and the airfoil chord (a line connecting the leading and trailing edges of the airfoil cross-section). If the angle of attack a increases beyond a critical value, the flow separates from the top surface of the wing W and the lift decreases to a much lower steady stalled value. This is called "stall," and under normal circumstances it is avoided at all costs.

FIG. 1 illustrates notionally the flow phenomena that occur when an airfoil first enters the flow regime associated with steady-state stall. FIG. 1 shows a wing W traveling from right to left at a high angle of attack $\alpha$. FIG. 1A shows the wing at time t, just as the wing encounters flow conditions that will lead to steady-state stall. Each of FIGS. 1B to 1E shows the wing position at a very short incremental time $\tau$ after the previous figure. As illustrated in FIG. 1, steady-state stall is a process that actually takes a finite time to develop into flow separation from the wing surface. FIG. 1A illustrates that the process of aerodynamic stall begins with a starting vortex C that is generated in the wake of the wing and a vortex CA at the leading edge of the wing W. This vortical flow continues to develop and become more complex as time passes, but as the flow is just beginning to separate from the top surface of the wing, the leading edge vortex CA causes the wing to generate lift as if the flow were still attached to its top surface. In fact, the leading edge vortex CA actually increases the local velocity over the wing, which increases the lift L as illustrated in FIG. 1B. As the wing W continues to travel at an angle of attack $\alpha$ greater than the stall limit, this vortical flow continues to increase in complexity, and the flow eventually does separate from the top surface of the wing, as represented in FIGS. 1D and 1E. It has been suggested that insects can take advantage of this momentary increased lift associated with the beginning of flow separation because they flap their wings and reverse wing direction, causing the flow to reattach before stall actually sets in fully. Dickinson, "Solving the Mystery of Insect Flight" (see above).

Of course, an insect is able to move its wings relative to the air using a complex, periodic flapping and pitching motion that changes the wings' orientation and prevents them from fully stalling. The difficulty in taking the same advantage of this delayed stall mechanism in a manmade device lies in finding a practicable way of introducing the cyclical flow variations necessary repeatedly to approach stall and then permit the working medium flow to reattach as in normal airfoil operation.

Turbomachinery, such as compressors and fans, use rotating blades with an airfoil cross-section to increase the pressure of the working medium. Marine propulsors, such as ships' propellers, torpedo propulsors, and water jets, also use rotating blades with airfoil cross-sections. The amount of energy transferred between any such device and its working medium is a direct result of the amount of lift generated by the blades. Accordingly, any manner of increasing such lift will improve the performance of these devices. However, there is no known mechanism by which such rotating machinery can take advantage of the significant transient lift increases achievable by operating in a delayed stall regime.

Non-steady-state flow leading to delayed stall has been studied. The rotating blades of a helicopter in forward flight experience cyclical variations in angle of attack that can lead to operation in the delayed stall regime for some of the blade travel. For that reason, The Boeing Company, in the course of its helicopter design efforts, has developed and published algorithms for analyzing delayed stall (usually called "dynamic stall" when referring to helicopter rotor blades). Harris et al., "Rotor High Speed Performance, Theory vs. Test," *J. of Amer. Helicopter Soc.*, Vol. 15, No. 3, April 1970, pp. 35–44; Tarzanin, "Prediction of Control Loads Due to Blade Stall," *J. of Amer. Helicopter Soc.*, Vol. 17, No. 2, April 1972, pp. 33–46. In particular, a formulation of the Boeing dynamic stall model by Wayne Johnson has proven especially useful for that purpose. Johnson, "Rotorcraft Aerodynamics Models for a Comprehensive Analysis," *Proc. Amer. Helicopter Soc.* 54th *Annual Forum*, Washington, D.C., May 20–22, 9998, pp. 71–93; Nguyen and Johnson, "Evaluation of Dynamic Stall Models with UH-60A Airloads Flight Test Data," *Proc. Amer. Helicopter Soc.* 54th *Annual Forum*, Washington, D.C., May 20–22, 1998, pp. 576–88.

More recently, unsteady flow lift enhancement principles, initially identified and studied in relation to the hydrodynamics of fish, have been explored as concepts that might be incorporated into the control surfaces of small underwater vehicles for the generation of very high maneuvering forces. Preliminary studies have shown that actively controlled flapping control surfaces can generate much higher maneuvering forces than what is possible using steady-state hydrodynamic forces. Bandyopadhyay, "Maneuvering Hydrodynamics of Fish and Small Underwater Vehicles," *Integrative and Comparative Biology*, Volume 42, No. 1, February 2002, pp. 102–117.

Further, it has been observed in a modeling study done at the NAVSEA Naval Underwater Weapons Center Division that a reduction in the rotational speed of a marine propulsor can lead to a reduction of radiated noise attributable to various mechanisms, such as blade tonal noise due to wake deficit, trailing edge singing, and ingested turbulence. These noise sources have been shown to be a function of rotational rate to the power of 4, 5, and 6, respectively. Based on a scaling analysis, it was shown that a reduction of 5% in a propulsor's revolutions per minute can reduce noise by 3–5 dB. Bandyopadhyay, et al., "A Biomimetic Propulsor for Active Noise Control: Experiments", *NUWC-NPT Tech. Rept.* 11,351, NAVSEA Naval Undersea Warfare Center (NUWC) Division, Newport, R.I., March 2002, pp. 1–15. Accordingly, if it were possible to increase the thrust generated by a particular propulsor, it would be likewise be possible to reduce its rotational speed and thus the noise it generates.

However, in spite of all of the prior art studies and work with algorithms involved in analyzing delayed stall lift enhancement, the fact remains that it has not been utilized in turbomachinery, propulsion devices, and other applications discussed herein.

SUMMARY OF THE INVENTION

It is an object of the present invention to provide an apparatus and method that utilize periodic, cyclical flow variations to harness the significant lift increases achievable when operating in a delayed stall flow regime.

In accordance with one aspect of the invention, an apparatus for changing the pressure of a fluid flow comprises a plurality of lifting elements spaced from each other in a cascade having an inlet and an outlet, each lifting element having an airfoil cross-section that provides lift as fluid travels relative thereto, and a device for directing the fluid into the inlet of the cascade, wherein at least one of the cascade and device varies a parameter of the flow relative to each lifting element in repeating cycles to cause the flow relative to each lifting element to begin to separate from the lifting element and then reattach thereto during each cycle.

In accordance with another aspect of the invention, the device comprises a stator with a plurality of stator blades arranged around an axis upstream of an axial flow impeller, and the parameter is a flow angle at which the flow is directed to the impeller, wherein each stator blade is oriented at a predetermined turning angle for circumferentially varying the flow angle above and below an angle of attack at which each lifting element experiences steady-state stall. The device can also be a second axial flow impeller upstream of the first impeller and mounted for rotation in a direction opposite the direction of rotation of the first impeller.

Another important aspect of the invention applies to a centrifugal compressor or pump, wherein the device includes a centrifugal impeller having a plurality of impeller elements arranged around a hub capable of rotating on an axis for directing the flow from the impeller into a diffuser, the cascade is disposed at an outlet of the impeller, and the parameter is a flow angle at which the flow is directed to the cascade, each impeller element being oriented at a predetermined exit angle for circumferentially varying the flow angle above and below an angle of attack at which each lifting element experiences steady-state stall.

When the apparatus incorporates an axial flow impeller, the device can include a plurality of lifting elements having an airfoil cross-section arranged in a second cascade around the impeller axis and each airfoil in the second cascade has a predetermined geometric property that varies circumferentially around the second cascade, which property includes at least one of lifting element turning angle, airfoil configuration, and distance between adjacent lifting elements. The axial flow impeller can be a propeller for generating thrust used to propel a body through the fluid, wherein the geometric property cyclically varies in a predetermined manner to minimize variations in thrust in the direction of the axis and moments transverse to the axis during each revolution of the impeller. The axial flow impeller can also be a rotor of a device selected from the group comprising an aircraft propeller, an aircraft propeller enclosed in a duct, and a ducted or unducted a marine propulsor. Further, the axial flow impeller can be a rotor of a device selected from the group comprising a fan of a turbofan jet engine, a compressor of a gas turbine, and a turbine of a gas turbine.

Yet another aspect of the invention relates to a method of controlling the pressure of a fluid flow, the method comprising the steps of providing a plurality of lifting elements spaced from each other in a cascade having an inlet and an outlet, each lifting element having an airfoil cross-section that provides lift as fluid travels relative thereto, directing the fluid into the inlet of the cascade, and varying a parameter of the flow relative to each lifting element in repeating cycles to cause the flow relative to each lifting element to begin to separate from the lifting element and then reattach thereto during each cycle. The parameter can be at least one of the magnitude of the velocity of the flow entering the cascade inlet, the direction of the velocity of the flow entering the cascade inlet, and the swirl in the flow entering the cascade inlet.

In an advantageous application of the method, the cascade comprises an axial flow impeller and the lifting elements comprise a plurality of impeller blades arranged around a hub capable of rotating on an axis, and the number of cycles is selected to provide a reduced frequency k from 0.1 to a value on the order of magnitude of 1, for all sections of each said blade over a predetermined operating range of said impeller, k being defined as follows:

$$k = \left(\frac{M\Omega}{V}\right)\left(\frac{c}{2}\right)$$

where k=reduced frequency, M is the number of cycles per revolution of the impeller, $\Omega$ is the impeller angular velocity in radians/sec., c is the chord length in feet of the impeller blade airfoil section being considered, and V is the average total velocity of the air flow in ft./sec. approaching the blade. In particular, the directing step can be implemented by a stator with a plurality of stator blades having airfoil cross-sections arranged around the axis upstream of the impeller, and the impeller blades have a predetermined airfoil cross-section that exhibits steady aerodynamic stall when flow approaches the blades at an angle above a steady-state stall angle. The parameter is a flow angle at which the flow is directed to the impeller, and each stator blade is oriented at a predetermined turning angle that varies the flow angle circumferentially around the axis from 10° below to 20° above the steady-state stall angle.

BRIEF DESCRIPTION OF THE DRAWINGS

The objects of the invention will be better understood from the detailed description of its preferred embodiments which follows below, when taken in conjunction with the accompanying drawings, in which like numerals refer to like features throughout. The following is a brief identification of the drawing figures used in the accompanying detailed description.

FIGS. 10A and 10B depict additional embodiments of the invention incorporated into an axial flow device, wherein FIG. 10A is a cascade view of an embodiment in which the airfoil configuration of the stator blades varies circumferentially around the stator axis and FIG. 10B is a cascade view of an embodiment in which the spacing of the stator blades varies circumferentially around the stator axis.

DETAILED DESCRIPTION OF THE PREFERRED EMBODIMENTS

Figure 2:
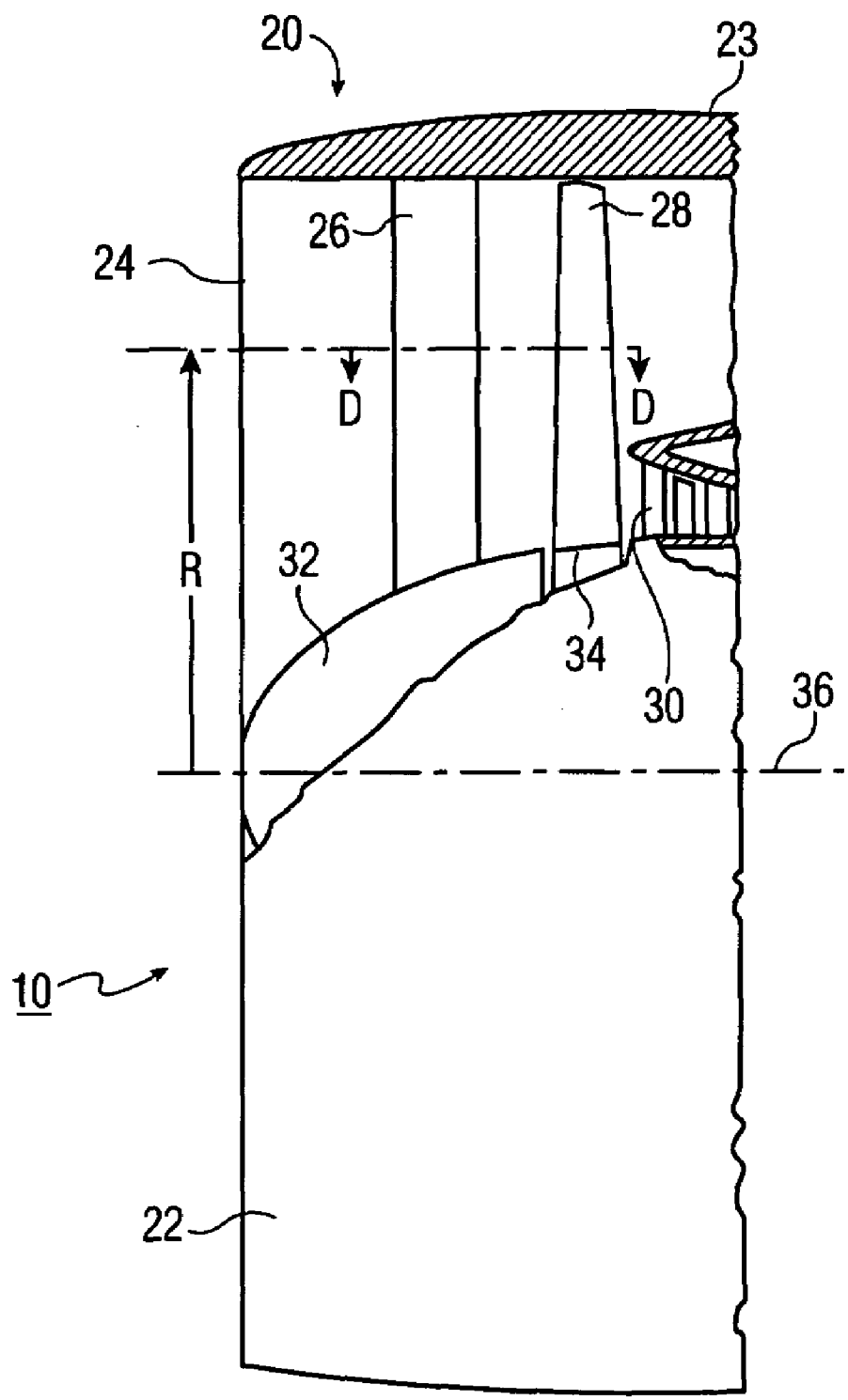
FIG. 2 is a side view, partially in section, of a fan for a turbofan jet engine in which the present invention may be advantageously incorporated.

FIG. 2 is a schematic depiction of a turbofan jet engine 10 with a fan stage 20, shown partially in section, that incorporates the present invention. As in conventional engines, the fan stage 20 includes a duct 22 with an annular duct wall 23 forming an inlet 24 that introduces air into the engine. The duct wall 23 encloses a row of stationary inlet guide vanes comprising a plurality of stator blades 26 and a rotating fan comprising a plurality of rotor blades 28. After passing through the fan stage, an inner annular portion of the air enters a core engine inlet 30 to be compressed and burned in the conventional fashion, while the rest of the air bypasses the core engine, also in conventional fashion. A hub 32 supports the inner portion, or root, of the stator blades 26, which are typically attached at their outer tips to the duct wall 23. The rotor blades 28 are attached to a disk 34 that is driven about an axis 36 by a turbine (not shown) of the jet engine.

As this description proceeds, it will become apparent that the present invention has application to technologies other than conventional turbomachinery such as that depicted in FIG. 2. However, the invention is described first in this context because it permits a clear exposition of the basic principles of the invention. Other specific and general applications of the invention will be mentioned after its basic principles have been explained.

Figure 3:
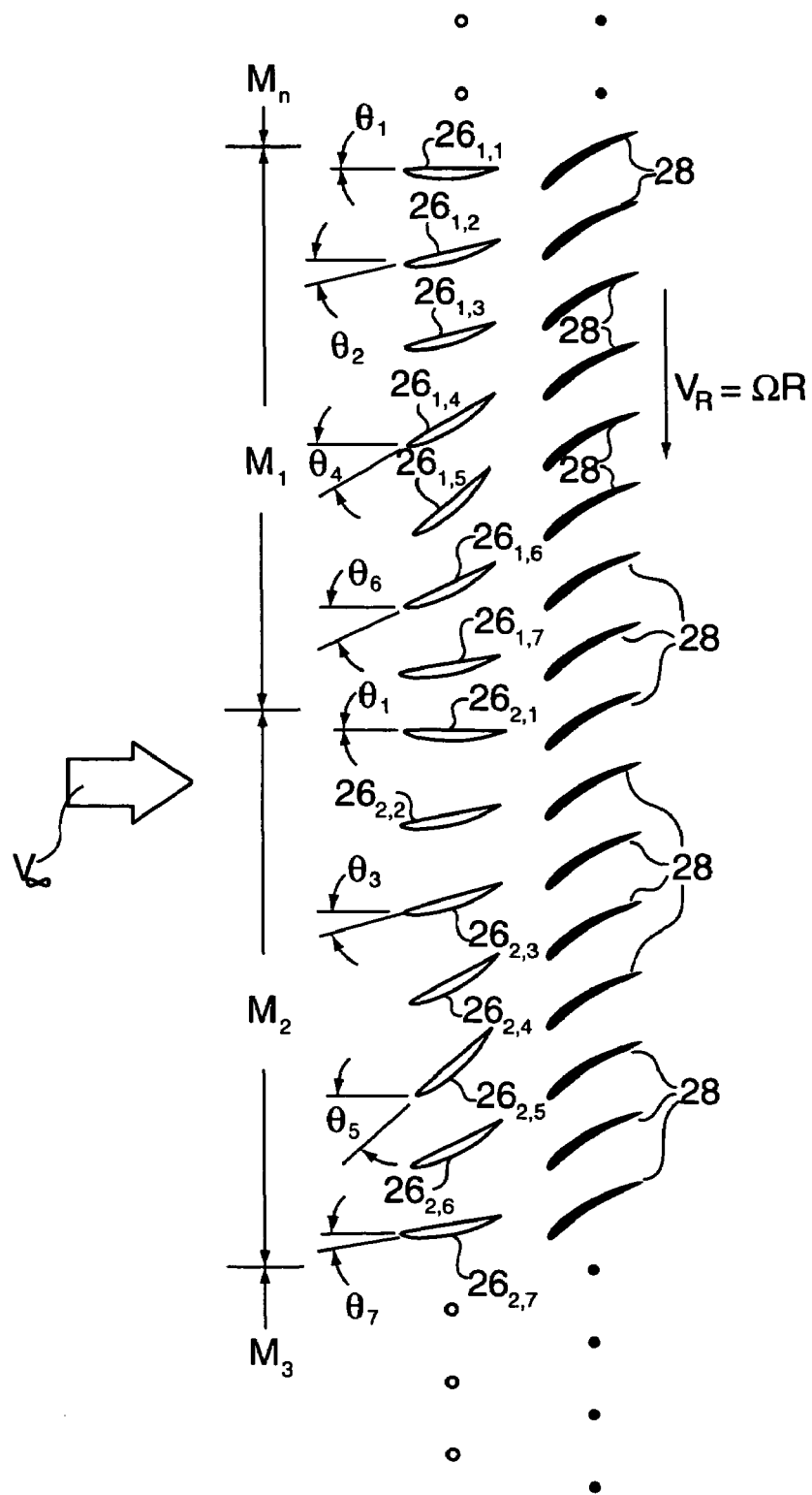
FIG. 3 is a cascade view of the stator and rotor stages of the fan shown in FIG. 2.

FIG. 3 represents the fan stage 20 looking radially inwardly at a given radius R (FIG. 2), showing a cascade of stator blades 26 and a cascade of rotor blades 28. This view shows a section taken along line D—D in FIG. 2, "unrolled" to enable depiction in two dimensions of the blades' relative positions. As the disk 34 rotates, the motion of the rotor blades 28 as seen in FIG. 3 is in a straight line shown by the velocity vector $V_R$. The velocity of the rotor blades is R times the rotational velocity of the disk; that is, $V_R = \Omega R$.

As is conventional, each rotor blade 28 has an airfoil cross-section so that it comprises a lifting element that generates a lift force as the working medium fluid (which is air in a jet engine) travels over the rotor blade. This lift is the ultimate source of the pressure rise across the fan stage. As with the airfoil discussed above in connection with FIG. 1, the lift generated by each rotor blade is determined by the velocity of the working medium fluid relative to the blade and the angle of attack between the velocity vector and the blade's camber line. As in a conventional fan, the orientation of the rotor blades 28 is constant around the circumference of the fan stage. That is, they have a fixed alignment relative to the axis 36 of the fan. The orientation of each blade relative to the fan axis may twist along the radial extent of the blade, as is also conventional, but a cross-section of each rotor blade 28 at a given radius R will be identical in shape and orientation to the other rotor blades, as in FIG. 3.

In accordance with the present invention, the stator blades 26 are arranged to orient the working medium relative to the rotor blades in a fashion that takes advantage of the increased lift associated with delayed stall. To that end, the working medium approaches the stator blades axially to the engine as represented by the velocity vector $V_\infty$. The stator blades direct the working medium flow toward the inlet plane of the cascade of rotor blades 28 at angles that vary cyclically around the stator circumference. The angles are chosen so that as the rotor turns, the flow over any given rotor blade 28 begins to separate from the blade (as in FIG. 1), and then reattaches to it. Each rotor blade undergoes such a cycle at least once, and preferably plural times, during each revolution of the rotor.

The stator blades 26 are arranged in multiple groups M, each with K blades (K=1 to $K_n$), and the notation used in FIG. 3 to identify the stator blades is "$26_{M,K}$." Groups M=1 and M=2 are depicted in FIG. 3, but there can be any number of such groups. Likewise, $K_n$=7 in FIG. 3, but those skilled in the art will appreciate that the number of stator blade groups M, the number K of individual stator blades in each group, and the number of rotor blades, are all chosen to obtain the desired performance under specified operating conditions.

Each stator blade also has an airfoil cross-section and its camber line forms a turning angle θ relative to the fan axis and therefore to the velocity $V_\infty$ of the air entering the fan stage. In accordance with this embodiment of the invention, the turning angle of the blades within each group gradually increases from $θ_1$ and then gradually decreases from a maximum value to $θ_7$. Those skilled in the art will recognize that the cyclic variations in flow can be provided by variations in other geometric properties of the blades, such as camber, chord length, airfoil shape, and/or blade spacing.

Figure 4:
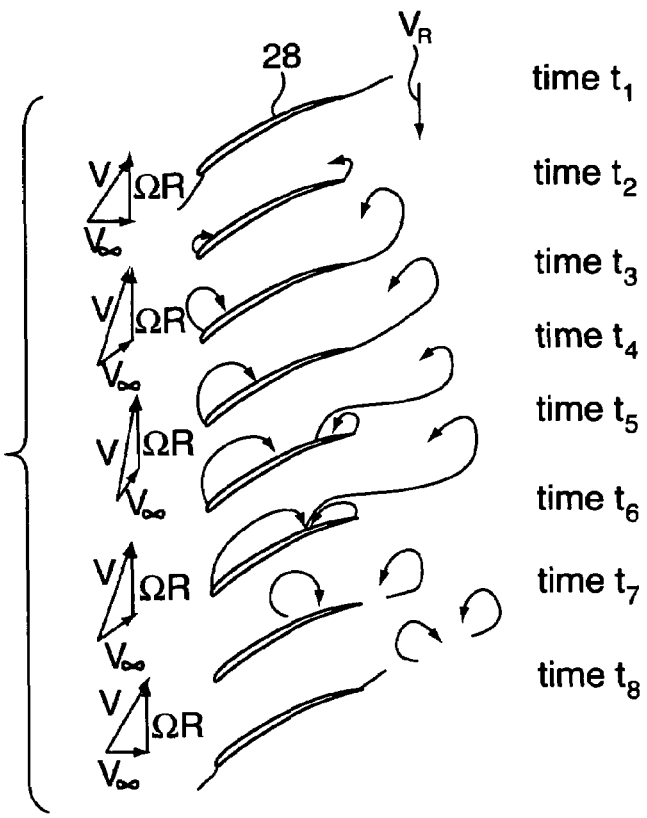
FIG. 4 illustrates how the flow varies over time for a single rotor blade in the cascade shown in FIG. 3.

FIG. 4 notionally depicts the flow over a single rotor blade 28 at times $t_1$ to $t_8$ as the rotor rotates. At time $t_1$ the velocity vector $V_\infty$ of the flow from the stator in this example is generally axial to the engine (see θ for stator blades $26_{M,1}$ in FIG. 3). The working medium velocity V relative to the rotor blade is the vector sum of $V_\infty$ and $V_R$ (ΩR). The rotor blade is oriented so that under the operating conditions shown, the flow over the rotor blade is fully attached as in conventional turbomachinery. However, at subsequent times t the rotor blade 28 encounters a relative velocity V that first increases in magnitude and changes direction, and then decreases in magnitude and begins to return to its original direction, in accordance with the different turning angle θ of each stator blade that is passed by the rotating rotor blade.

Figure 1:
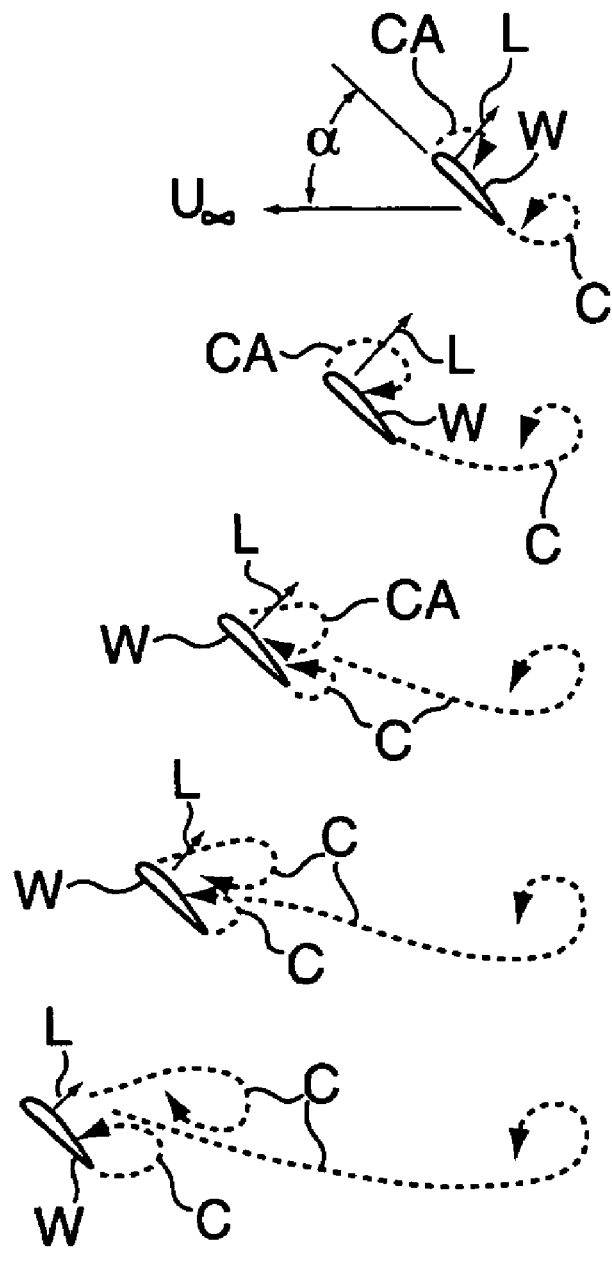
FIG. 1, comprising FIGS. 1A to 1E, schematically illustrate the flow over a wing at the onset of aerodynamic stall.

So at time $t_2$, for example, the velocity vector $V_\infty$ has changed as a result of the change in the stator blade turning angle. Thus, while $V_R$ remains constant, the resultant velocity V of the working medium becomes larger and approaches the rotor blade at a steeper angle of attack as time passes, as will be appreciated from FIG. 3. The turning angle of the stator blades in each group M is chosen to cause air flow over the rotor blade begin to operate under the influence of the vortical flow characteristic of delayed stall, as depicted in FIG. 1. Then, the rotor blade passes the stator blades in the group with a smaller turning angle θ. Accordingly, the flow reattaches to the rotor blade by time $t_8$, after which the cycle depicted in FIG. 4 is repeated. Each rotor blade 28 experiences the same flow cycle during each revolution of the rotor.

Figure 5:
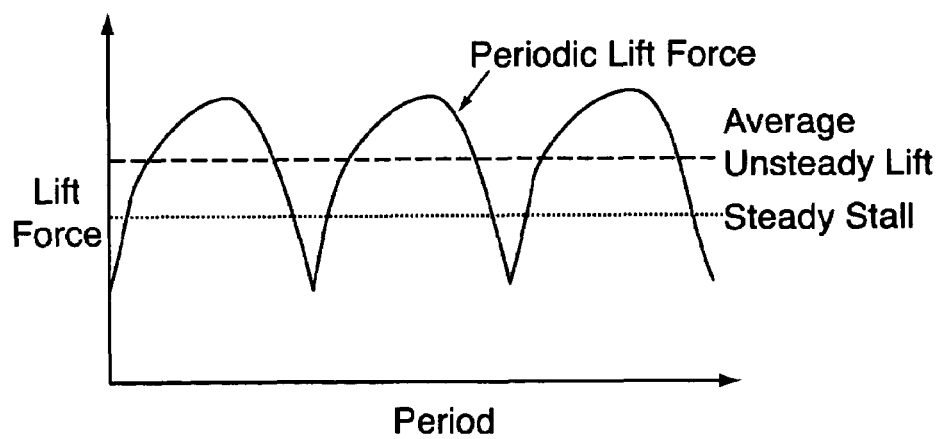
FIG. 5 is a plot that illustrates the lifting force on the blade shown in FIG. 4, depicting the increase in average lift achieved with the present invention as compared to the potential maximum steady-state lift.

FIG. 5 notionally depicts the resultant lift on a single rotor blade 28. In this plot the abscissa is time and the ordinate is lift. The fine dotted line depicts the theoretical maximum lift obtainable in steady-state flow, namely the lift at the point just before the lifting element (rotor blade) stalls. In contrast, the present invention generates a much greater peak lift. And although the periodic lift force typically will be below the steady-state stall limit for short periods, the average of the unsteady lift force over time is increased, as shown by the coarser dotted line. Since the performance of the fan depends on the magnitude of the lift generated by each rotor blade, the present invention represents a significant performance improvement.

FIG. 5 also illustrates an inherent feature of apparatus incorporating the present invention, namely that the cyclic variations in flow can introduce periodic variations in thrust when the invention is applied to devices such as propellers and marine propulsors. While these variations are undesirable, the nature of the invention also inherently includes a manner of minimizing variations in the thrust. That is, since the flow variations are cyclical in nature, their periodicity can be controlled by carefully selecting the number and properties of the propeller blades and of the upstream device that directs the flow into the propeller. Moreover, the plot in FIG. 5 represents the lift generated by a single rotor blade. Accordingly, it will be immediately apparent that by judicious selection of the number and properties of the components of the invention, the phases of the periodic lift forces on all of the individual propeller blades can be controlled to minimize the difference between the total maximum and minimum thrust generated by all of the blades as the propeller rotates. Conversely, there may be applications in which it is desirable to maximize these thrust variations. For example, such thrust variations can be used in a pump to provide a pulsating water jet from a pressure washer to enhance its cleaning action, or thrust variations could be used to increase acoustic signatures of active acoustic countermeasure devices such as acoustic decoys.

Implementation of this force tailoring aspect of the invention can best be understood by referring also to FIGS. 3 and 4. As previously explained, proper selection of the onset flow variation period, magnitude, and/or direction, results in each rotor blade 28 undergoing periodic cycling of the local flow incidence above the steady stall value. In turn, this results in periodic delayed stall lift enhancement on each blade in accordance with the principles underlying the present invention, as shown in FIG. 5. Thus, each blade cycles between stall onset, at which the flow begins to separate from the blade and creates an enhanced lift, resulting in the formation of a leading edge vortex, and flow reattachment when the leading edge vortex detaches and convects downstream (see FIG. 1).

The onset flow variation period can range from a minimum of one cycle in 360° to any integer number of such cycles, limited only by the ability to impart the required upstream periodic flow variations that induce the delayed stall phenomenon. By selecting the number of onset flow cycles per revolution relative to the number of rotor blades, the system can be designed for particular phasing of the unsteady delayed stall loading on individual blades, which in turn determines the integral effect on the total rotor system. For example, providing M cycles/revolution in the onset flow variation, and using 2MJ rotor blades, where J=1, 2, 3, ..., will cancel the variations in thrust produced by individual blades and thus cancel moments transverse to the propeller axis. And in a propeller with N blades, and an integer multiple of N cycles/revolution in the onset flow variation, the unsteady response of all of the blades will be in unison.

Working Example

Figure 6:
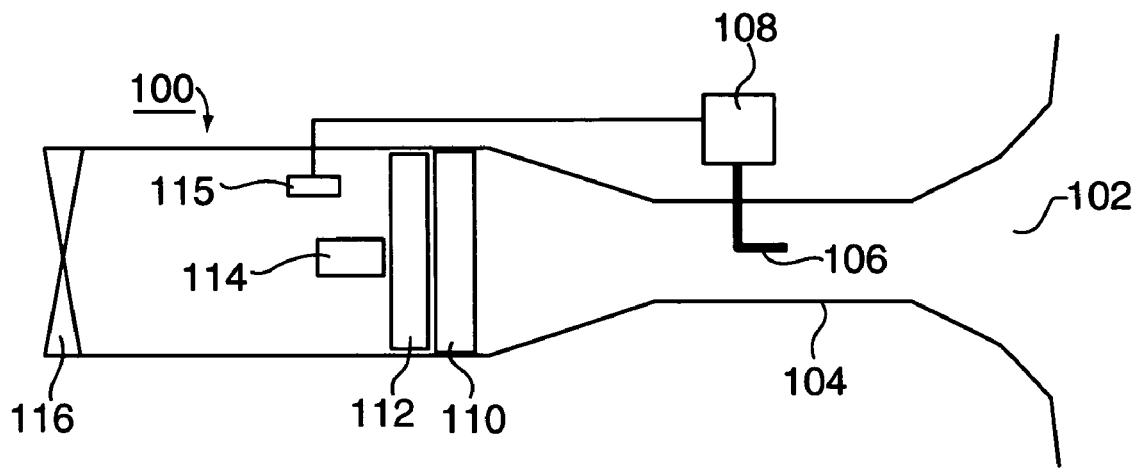
FIG. 6 is a schematic depicton of a test rig used to demonstrate the increased pressure rise achieved using a stator/rotor configuration incorporating the present invention.

FIG. 6 is a schematic depiction of a test rig 100 constructed to demonstrate the increase in pressure rise obtainable using a stator/rotor combination like that depicted in FIG. 3, as compared to that obtainable with a conventional rotor/stator combination. An inlet 102 admitted air to a throat section 104 containing a pitot static tube 106 connected to instrumentation 108 to determine pressure and the mass flow rate through the device. The inlet had a bell-shaped fairing and a honeycomb-like flow straightener (not shown) to minimize swirl in the air flow introduced to the throat section. A fan stage downstream of the throat section 104 comprised a stator depicted schematically at 110. The stator was located immediately upstream of a rotor depicted schematically at 112 driven by a variable speed motor 114. Additional measuring apparatus 115 connected to the instrumentation measured the pressure of the air exiting the fan stage. A flow control valve 116 was disposed at the exit of the test rig.

The rotor 112 comprised eight untwisted blades with a NACA 0006 airfoil cross-section having a 4" chord. They were mounted to a hub (not shown) with a 6" diameter in a manner that permitted their pitch (angle of attack) to be changed for different test runs. The section of the duct containing the fan stage was 22" in diameter, so each rotor blade had a span of about 8". The stator 110 comprised 12 blades identical to the rotor blades. They were attached to the hub and the wall of the test rig in a manner that permitted their pitch to be changed individually, as well as permitting them to be removed for test runs involving different numbers of stator blades.

Figure 7:
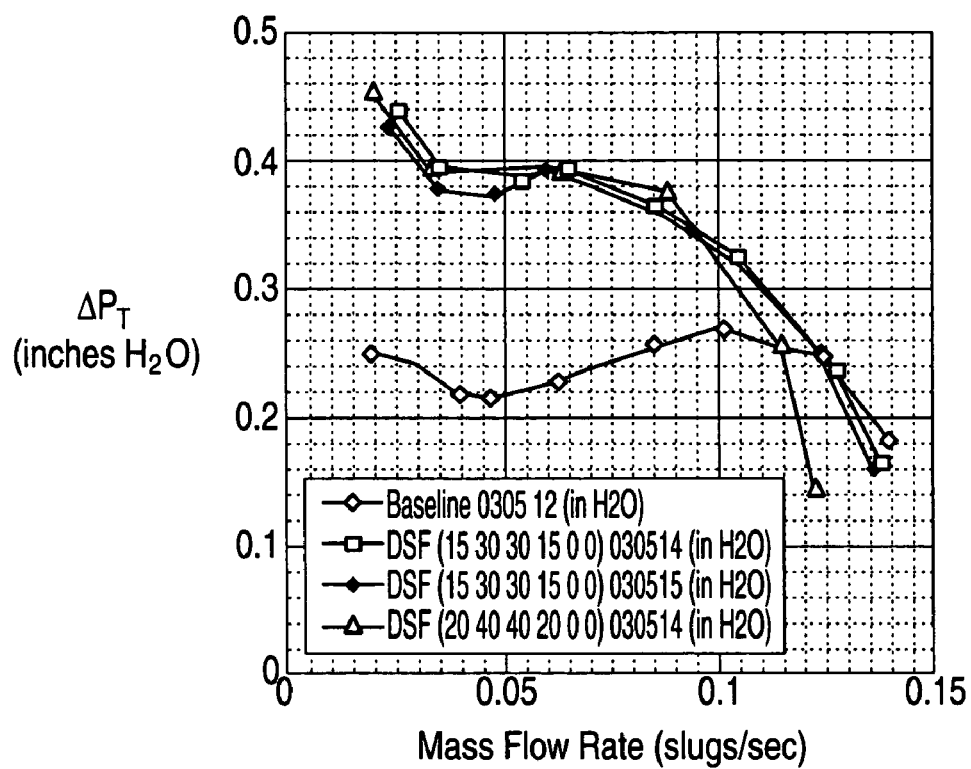
FIG. 7 plots data generated using the test rig shown in FIG. 6 to compare various rotor/stator configurations incorporating the present invention and a baseline configuration representing the prior art.

FIG. 7 plots the results of a series of tests using the test rig depicted in FIG. 6. The abscissa of this graph is the mass flow rate of air through the fan (controlled by adjusting the flow control valve 116), and the ordinate is the rise in total pressure rise across the fan, measured in inches of water. For these tests, the rotor blades were set to have a pitch of 45° relative to the axis of the fan. The motor rotational speed was 1125 rpm. One test was run with all of the stator blades having a turning angle $\theta=0°$ in order to establish a baseline against which to measure the results achieved by implementing a stator configuration in accordance with the invention. The results of this test are depicted by the plot labeled "Baseline 030512 (in H2O)." The remaining plots indicate the results achieved by implementing stator turning angle distributions in accordance with the invention. In these tests, there were two groups M of stator blades, with six blades in each group (K=6). The notations identifying these plots follow the convention "DSF ($\theta_1, \theta_2, \theta_3, \theta_4, \theta_5, \theta_6$)," wherein $\theta$ represents the turning angle relative to the fan axis and the subscript is the number K of a particular blade in the group. In other words, for the first "DSF" plot, the 12 stator blades had turning angles of 15°, 30°, 30°, 15°, 0°, 0°, 15°, 30°, 30°, 15°, 0°, and 0°, respectively.

As FIG. 7 illustrates, a fan incorporating the present invention significantly increases the pressure rise achieved under proper operating conditions. At lower mass flow rates, there are significant differences in pressure rise between the results achieved with a conventional fan (the baseline plot) and fans incorporating the invention. Under these loading conditions, a conventional fan, having stator blades that provide the same turning angle around the fan circumference, operates such that the pressure rise across the fan increases as the flow rate decreases, up to a maximum pressure rise where the fan blades begin to stall. At this point, further reduction in the mass flow causes the rotor blades to enter a steady stall regime in which the pressure rise across the fan drops significantly.

In contrast, fans that take advantage of cyclical delayed stall in accordance with the invention show an increase in pressure rise for a given mass flow rate. Additionally, the invention provides a much higher pressure rise at lower mass flow rates, and thus offers a much wider mass flow operating range (and increased stall margin). The pressure rise vs. mass flow curves in FIG. 7 tend to converge at high mass flow rates because under these conditions the rotor blades are very highly loaded and operating far from the high incidence conditions where blade stall occurs.

Additional Attributes of the Invention

It will be appreciated from the above discussion that a basis of the present invention was the insight to consider the flow over a flapping, pitching insect wing from the vantage point of the wing itself. To an observer moving with the wing, the wing is fixed and the angle of attack of the approaching flow varies cyclically. That insight led to the realization that such variations could be applied to rotating machinery, which by its nature involves cyclic motion. That is, rotating components by their nature operate cyclically, and the invention takes advantage of that property to introduce cyclical variations to the flow approaching a cascade of lifting elements without the necessity of incorporating complex mechanisms to vary the configuration of the apparatus during operation. Thus, systems in accordance with the invention can be completely passive and involve no moving parts beyond those already present in rotating machinery. Accordingly, the invention can introduce significant performance improvements into a robust, durable structure. It can also be easily retrofitted into existing propulsion and turbomachinery apparatus simply by altering any existing stator, or adding one, to introduce inlet flow variations in accordance with the invention.

Figure 8:
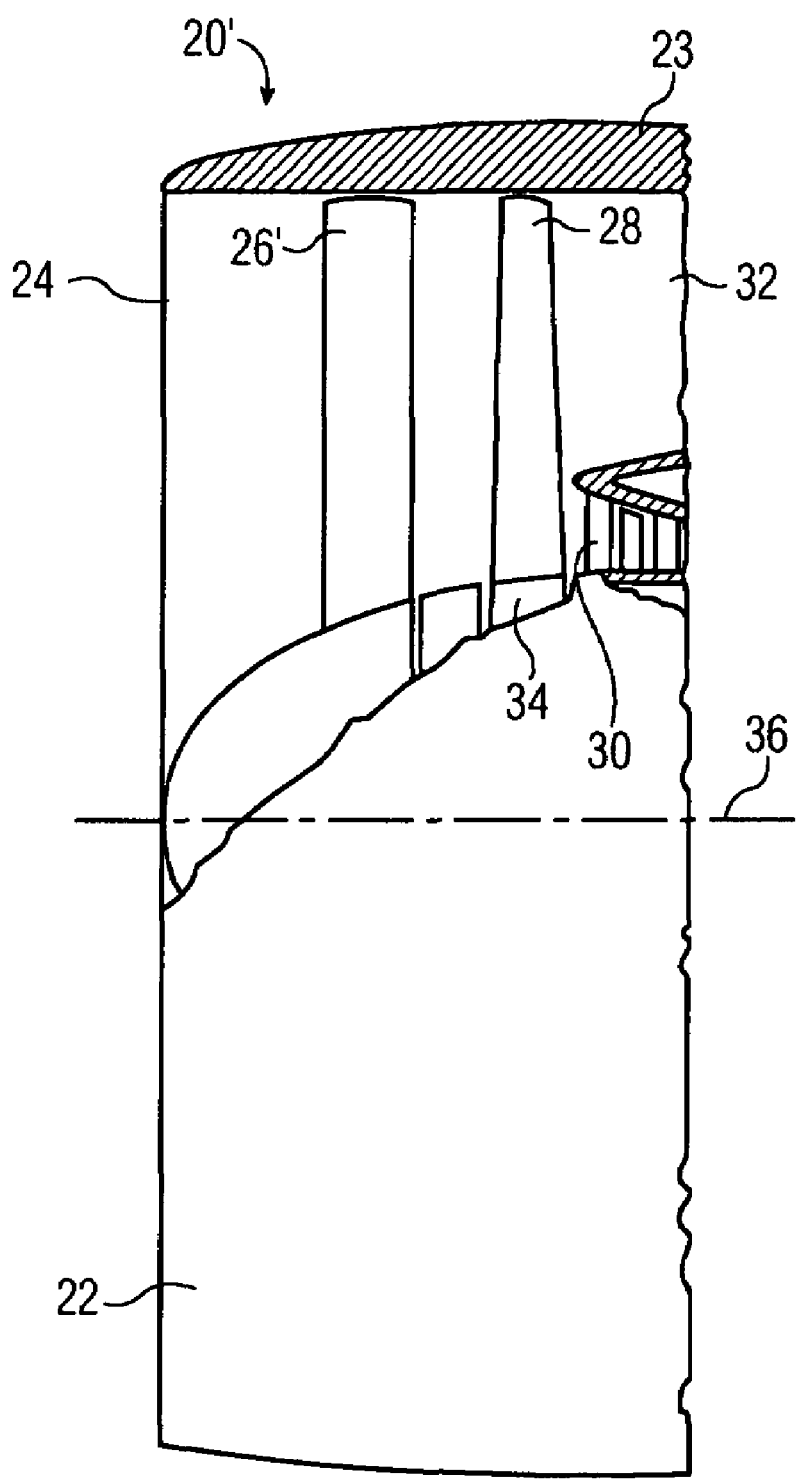
FIG. 8 is a side view of an alternate embodiment of the fan shown in FIG. 2.

Even though the discussion above of the general principles underlying the invention uses an embodiment incorporating just a rotating cascade to illustrate the invention, those skilled in the art will readily appreciate that the invention can be applied in a variety of ways to myriad different apparatus. For example, the stator used to vary cyclically the angle at which flow in directed to the rotor can be replaced by any device that provides a cyclic variation in a flow parameter that will cause each rotor lifting element to cycle through a flow regime in which the flow begins to separate from the lifting element, as shown in FIG. 1, and then reattaches thereto. With that it mind, it will be appreciated that the stator discussed above can be replaced with a counter-rotating rotor with blades corresponding to the stator blades 26 discussed above. FIG. 8 illustrates an alternate embodiment 20' of the fan stage 20 shown in FIG. 2, in which counter-rotating rotor blades 26' replace the stator blades 26 in FIGS. 2 and 3. The operational principles discussed above using a stator to illustrate the invention apply equally to an embodiment like that shown in FIG. 8 using counter-rotating impeller blades 26' in place of the stator blades 26. In addition, an implementation of the invention using a counter-rotating impeller can also be retrofit to an existing apparatus.

Figure 9:
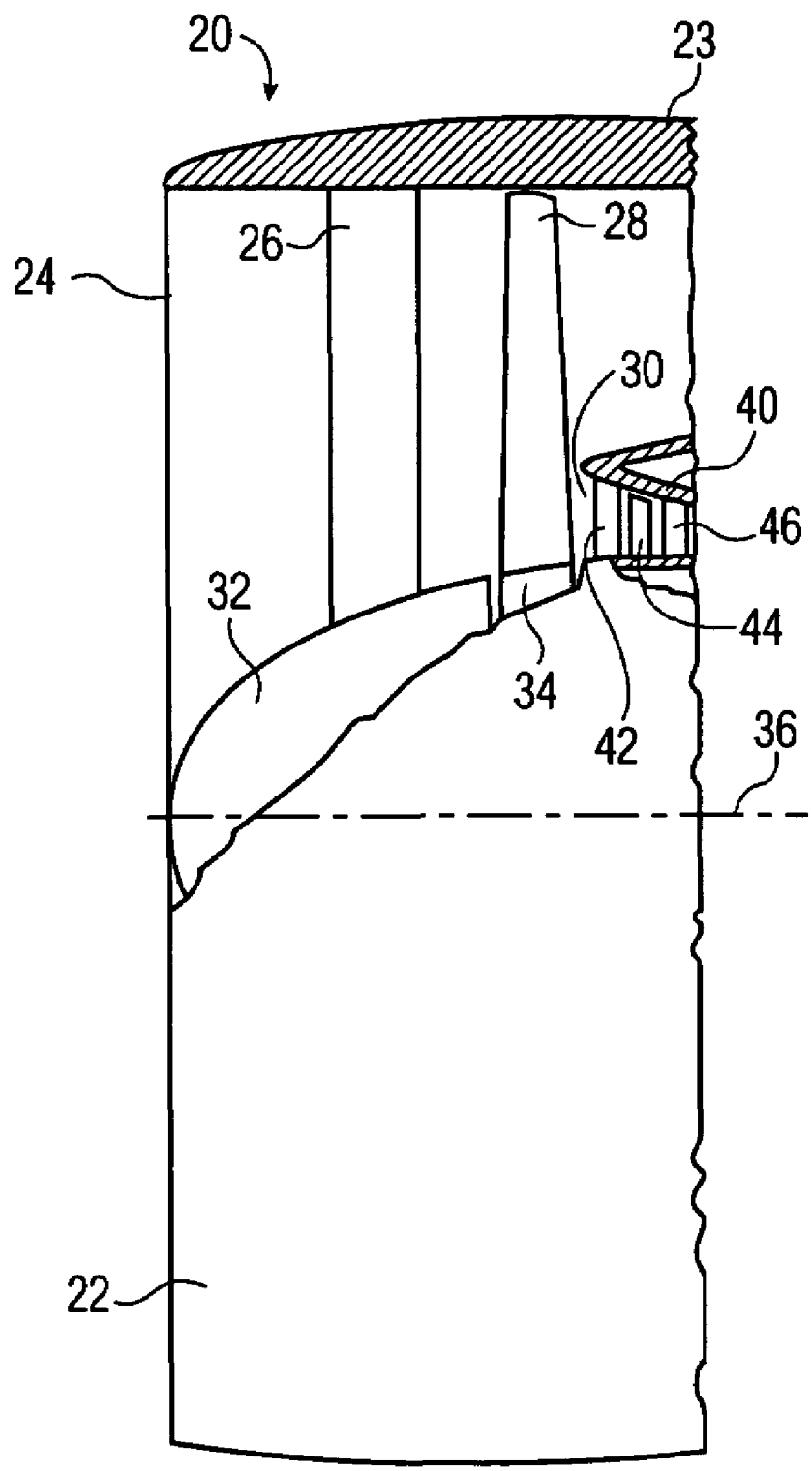
FIG. 9 illustrates a multi-stage embodiment of the invention.

The invention can be realized in myriad other forms, as well. As one example, the embodiment discussed above in connection with FIG. 2 is a single stage fan, with one rotor and one stator. The invention is applicable to a multiple stage device, in which the flow exiting the rotor of one stage is directed into the stator of a downstream stage. FIG. 9 depicts such an embodiment, in which the compressor 40 of a jet engine like that shown in FIG. 2 is constructed in accordance with the principles of the present invention. In that regard, the first stage of the compressor includes a stator comprising blades 42 and a rotor comprising blades 44. The compressor rotor blades 44 are conventional and correspond to the rotor blades 28 of the fan discussed in connection with FIGS. 2 and 3. The compressor stator blades 42 are arranged to orient the working medium relative to the compressor rotor blades 44 in a fashion similar to that discussed above in connection with the manner in which the fan stator blades 26 orient the working medium relative to the fan rotor blades 28. Likewise, the stator blades 46 of the second compressor stage can be arranged in the same fashion relative to the second stage rotor blades (not shown). In this manner, the flow exiting the outlet of the axial flow impeller of one stage is directed to the stator of a downstream stage.

Figure 10A:
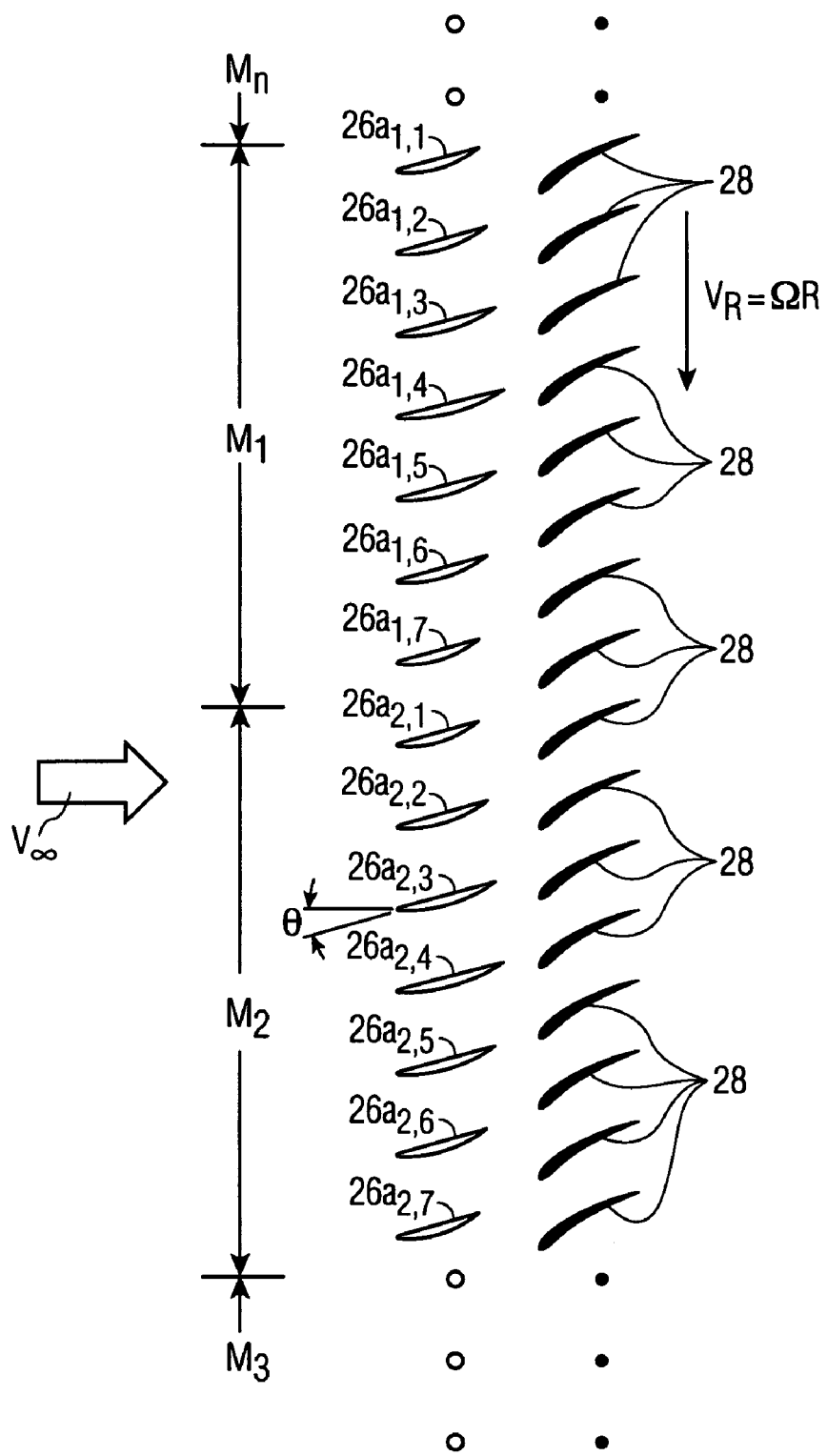

In addition, the airfoils comprising the blades of the stator (or counter-rotating impeller) can be varied by changing geometric properties other than turning angle. For example, the blades' airfoil configuration (such as camber, chord length, etc.), the spacing between adjacent blades, and other properties can be controlled in the manner discussed above to periodically effect the increased lift associated with delayed stall. FIG. 10A shows an embodiment of the invention in which the chord length of the stator blades is varied cyclically. In FIG. 10A the stator blades 26a are arranged as described in connection with FIG. 3, in multiple groups M, each group having K blades. The notation used in FIG. 10A to identify the stator blades is "$26a_{M,K}$." Groups M=1 and M=2 are depicted in FIG. 10A, but as in FIG. 3, there can be any number of such groups. Likewise, $K_n$=7 in FIG. 10A, but those skilled in the art will appreciate that the number of stator blade groups M, the number K of individual stator blades in each group, and the number of rotor blades, are all chosen to obtain the desired performance under specified operating conditions. Each stator blade 26a has an airfoil cross-section, and the camber line of all of the blades forms the same turning angle θ relative to the fan axis and therefore to the velocity $V_\infty$ of the air entering the fan stage. In accordance with this embodiment of the invention, the chord length of the blades within each group changes in accordance with the principles discussed in connection with the embodiment shown in FIG. 3.

Figure 10B:
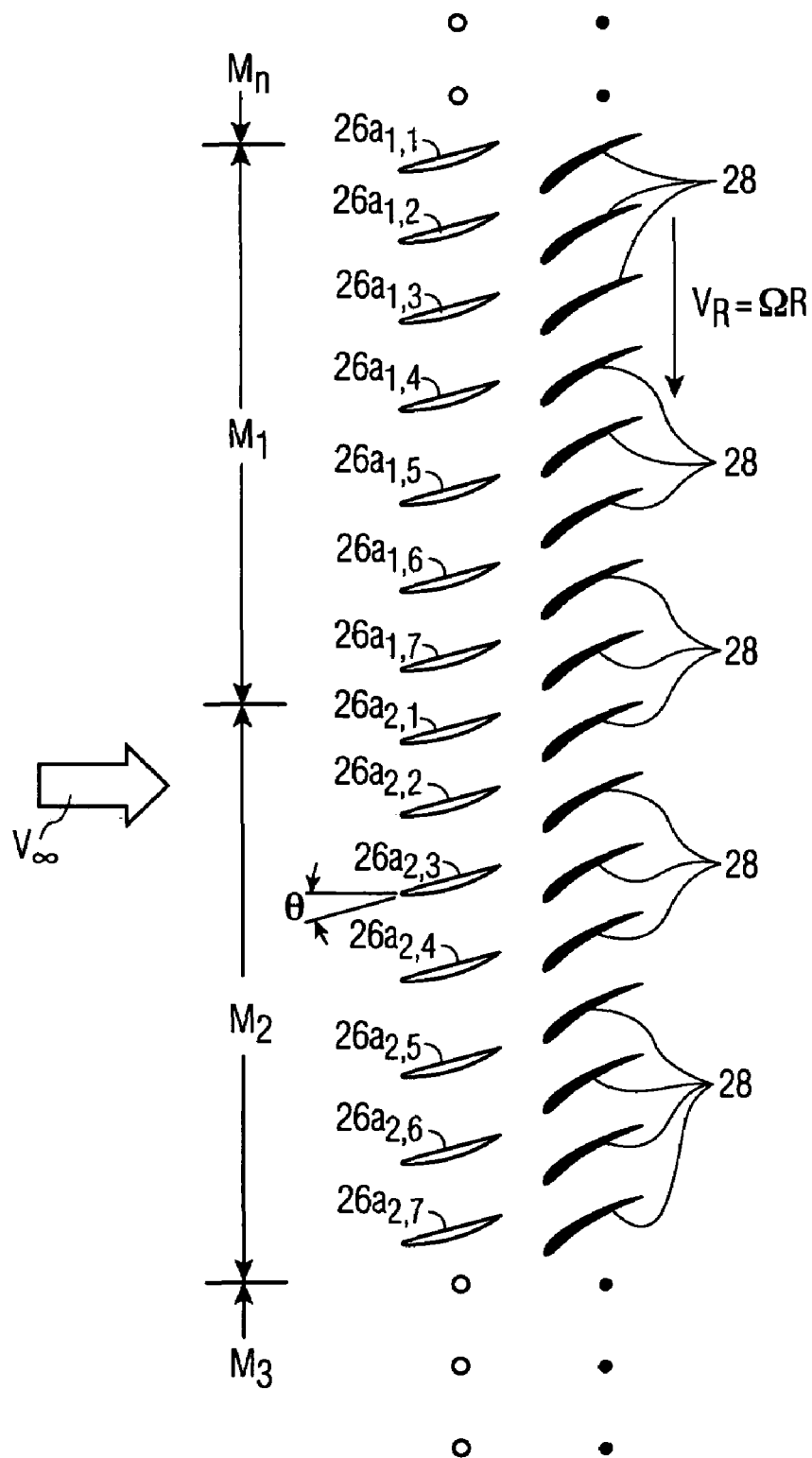

FIG. 10B shows an embodiment in which the spacing between the blades is varied cyclically in accordance with the principles of the invention. The notation used in FIG. 10B to identify the stator blades is "$26b_{M,K}$." Groups M=1 and M=2 are depicted in FIG. 10B, but as in FIGS. 3 and 10A, there can be any number of such groups. Likewise, $K_n$=7 in FIG. 10B, but those skilled in the art will appreciate that the number of stator blade groups M, the number K of individual stator blades in each group, and the number of rotor blades, are all chosen to obtain the desired performance under specified operating conditions. Each stator blade 26b has an airfoil cross-section, and the camber line of all of the blades forms the same turning angle θ relative to the fan axis and therefore to the velocity $V_\infty$ of the air entering the fan stage, and the blades all have the same chord length c. In accordance with this embodiment of the invention, the spacing between the blades within each group changes in accordance with the principles discussed in connection with the embodiment shown in FIG. 3.

Still other variations are possible, in that the geometric properties of any given blade can be controlled during operation to account for different operating conditions. This could be accomplished in a number of ways. One convenient structure for making adjustments during operation could use shape-memory alloy tabs or tab actuators, as discussed in U.S. Pat. No. 5,752,672 to McKillip and U.S. Pat. No. 6,345,792 to Bilanin et al., to change the blades' turning angles. The disclosures of those patents relating to the manner of implementing such structure are incorporated herein by reference. Such tabs could be incorporated on FIG. 3's stator blades 26 to selectively change their turning angles to adjust for operation of the stator/rotor combination under off-design conditions.

Figure 11A:
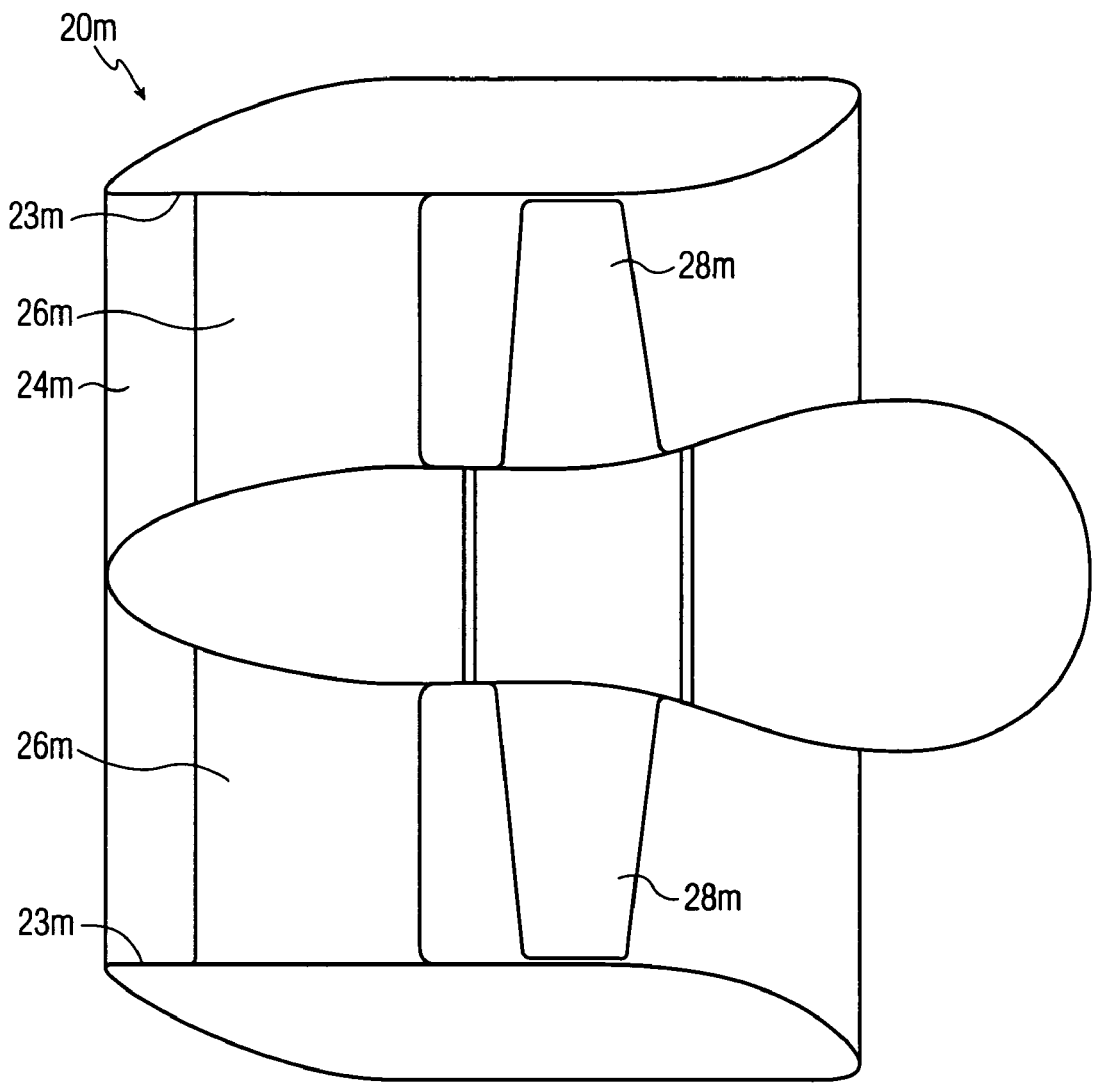
FIG. 11A shows an embodiment of the invention as applied to a marine propulsor.
Figure 11B:
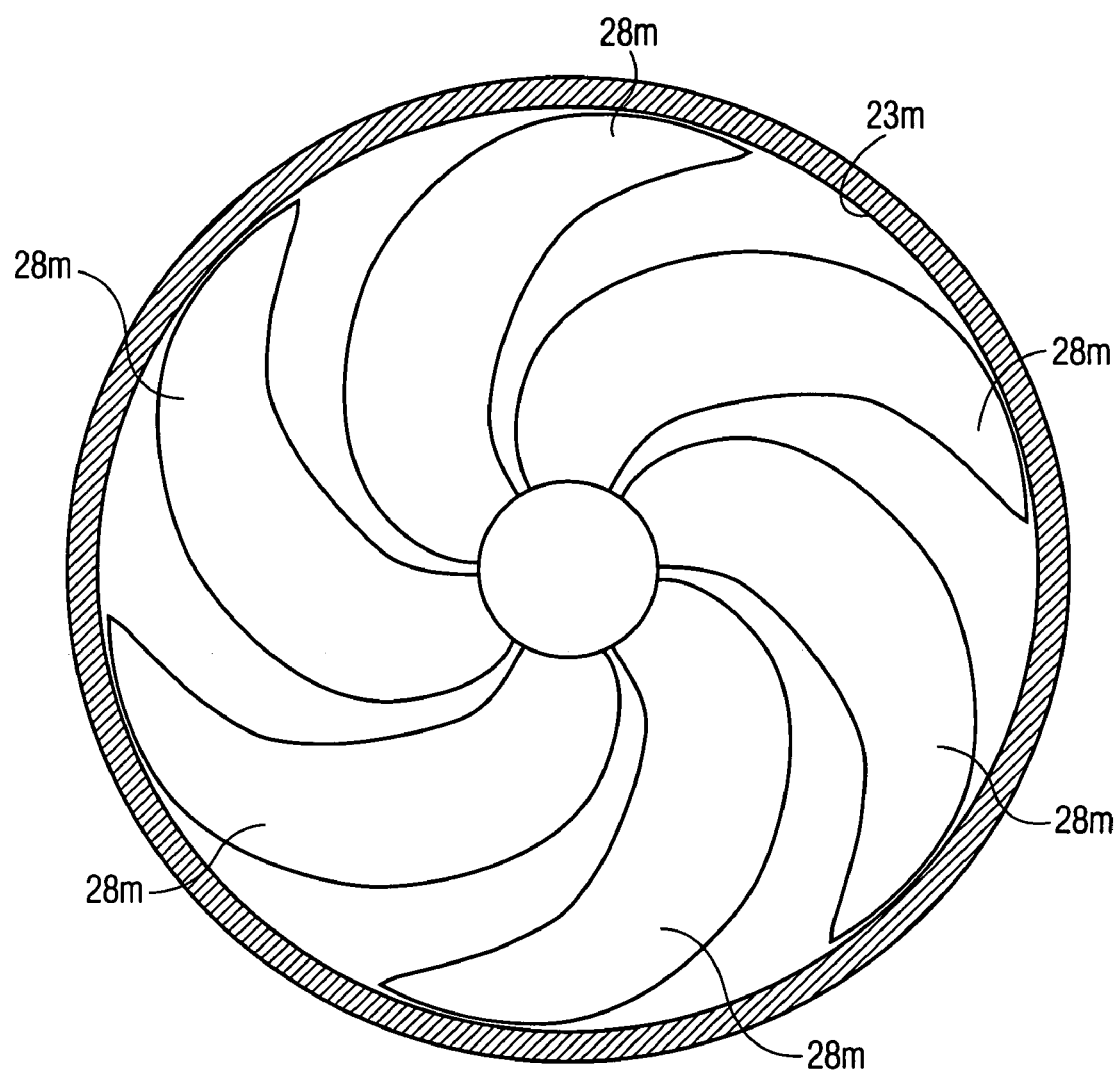
FIG. 11B depicts skewed rotor blades incorporated into the marine propulsor in accordance with another aspect of the invention.

In addition, the rotor blades can be skewed, that is, angled in the direction of the rotational axis, which, as is known, will introduce a radial component into the flow downstream of the blades. FIGS. 11A and 11B depict a marine propulsor having a rotor with skewed blades in accordance with this aspect of the invention. The construction of marine propulsors is well known those of ordinary skill in this art, as seen in U.S. Pat. Nos. 5,078,828, 5,252,875, 5,289,068, and 5,607,329, the latter patent being an example of a marine propulsor with skewed rotor blades as shown in FIG. 10 thereof. As seen in FIG. 11A, a typical marine propulsor 20m includes an annular duct wall 23m forming an inlet 24m that introduces water into the marine propulsor. The duct wall encloses a row of stationary vanes 26m and a rotating propeller comprising a plurality of propeller blades 28m. As seen in FIG. 11B, which is a view looking axially downstream within the marine propulsor, the propeller blades 28m are skewed. Based on insect studies like those already discussed, a radial flow component in the flow directed toward the cascade of lifting elements should stabilize the leading edge vortex generated at the onset of stall. That should likewise prolong the duration of the enhanced-lift condition. If the device for introducing a cyclic variation in the flow directed to the rotor blades 28 is itself a counter-rotating rotor, as discussed above, its blades can be skewed either instead of the rotor blades 28, or both the rotor blades 28 and the blades of the upstream counter-rotating rotor can be skewed.

A particularly advantageous manner of implementing the invention in a stator/rotor combination like that discussed above models the flow conditions at the rotor cascade inlet as a series of local velocity triangles such as those depicted in FIG. 4. The modeling technique starts with the steady rotor stall operating conditions (rotor rotation speed, rotor geometry, and uniform inlet flow conditions), to which a periodic circumferential variation in inlet flow properties is added to initiate delayed stall lift enhancement on each individual rotor blade. While delayed stall can be introduced through a combination of cyclic variations in either or both of axial flow velocity or swirl velocity, a preferred form of the invention introduces variations in swirl velocity by proper design of an upstream stator, as discussed above in connection with FIG. 3. Generally, the occurrence or degree of delayed stall lift enhancement for an isolated pitching airfoil is a function of the reduced frequency of oscillation, the mean incidence of the oncoming air flow relative to the airfoil chord, and the amplitude of the pitching motion.

The existence of delayed stall is modeled in accordance with the conventional dimensionless parameter "reduced frequency of oscillation," adapted for use with the present invention by defining it in relation to the blade semi-chord as follows:

$$k = \left(\frac{M\Omega}{V}\right)\left(\frac{c}{2}\right)$$

where k=reduced frequency, M is the number of inlet flow cycles per revolution, Ω is the rotor angular velocity in radians/sec., c is the chord length of the blade airfoil section being considered, and V is the average total velocity of the air flow approaching the rotor blade (see FIG. 4). It is known that with the proper mean incidence, and pitching amplitude around the mean incidence, an airfoil is in a delayed lift enhancement regime for k>0.01, and that the degree of lift enhancement generally increases as k increases to a maximum value on the order of magnitude of 1. It is believed that the advantages of delayed stall lift enhancement will be achieved when k is from 0.1 to a value on the order of magnitude of 1 over the entire operating range of a particular rotor.

In applying the present modeling technique, the steady rotor stall operating conditions are first determined using conventional methods. For a particular rotor geometry (airfoil cross-sectional shape, chord length, pitch angle, radius, etc.), rotational speed, mass flow rate through the rotor and free stream velocity ($V_\infty$), the average total velocity V can be determined. The reduced frequency k is then set to the order of magnitude of 1 by specifying M (the number of flow variation cycles per rotor revolution) in accordance with the above equation, rearranged as follows:

$$M = \left(\frac{2Vk}{\Omega c}\right)$$

M is then rounded to the nearest integer, which is required by definition to make the inflow variation periodic in 360°. Next, the inlet flow cycle is defined by considering local rotor velocity triangles as a function of circumferential position. See FIG. 4. Starting with steady rotor stall onset incidence, a circumferential variation in the inlet flow is superimposed on this mean flow, which variation may include any combination of swirl variation and/or axial flow variation such that the resulting local rotor flow incidences will cycle between 10° below and 20° above the steady stall incidence. With the flow incidence range thus defined, the turning angles of the upstream stator blades or inlet guide vanes are chosen to provide an inlet flow that yields the desired cyclic variation in the rotor incidence. In theory, the incidence would be raised as rapidly as possible in the cycle, held at the high incidence for approximately half the cycle, and then dropped back to a low value just long enough for the flow on the rotor blade to recover (reattach). In practice, the inlet flow cyclic structure is limited by the number of stator blades and the maximum local flow turning possible through the stator blade row.

The approach used in the working example discussed above used circumferential variation of stator pitch (turning angle) to accomplish the rotor inlet incidence variation. The pitch variations of the 12 stator blades used in that example are mentioned above, and were determined by using a mean turning angle of 10° and varying it between 10° below and 20° above that value. It should be noted that that range of angles is exemplary, and significant lift enhancement is possible by varying the stator blade turning angle through a range 5° below and 15° above the mean value.

It will be appreciated that this local-velocity-triangle design approach can be incorporated into a three-dimensional stator/rotor design analysis, which will increase its accuracy as a modeling tool but also introduce significant complexity by utilizing equations that require more computing power and longer computational times. Accordingly, it is preferable to identify the particular flow parameters that have the greatest potential influence on the outcome of the analysis. Among these will be the stator blade pitch distribution, which can be modeled as a baseline distribution and a superimposed two-parameter linear twist variation along the blade span, the distance between the stator and the rotor, and the pitch angle of the duct, if one is present. In addition, rotor blade flexibility can be used to enhance the effects of the invention. That is, the twist of a rotor blade changes along the blade span under fluid dynamics forces, and this property can be used in conjunction with appropriate stator design to overcome inherent limitations in the amount of turning that the stator blades can impart before they undergo flow separation. If these aeroelastic effects are factored into the model, it will introduce additional parameters such as the blade passage frequency (that is, rotational speed), the stiffness properties of the blades (for example, their torsional and lateral stiffness constants and elastic axis location), and inertial parameters such as the zeroth, first, and second sectional mass moments.

The present invention can also achieve noise reductions in rotating propulsion devices, which is particularly advantageous in marine applications such as ship or torpedo propellers, as well as in aeronautical applications. It is known that the sound radiated by rotating machinery increases as the $4^{th}$, $5^{th}$, or $6^{th}$ power of the angular velocity of its rotational components, depending on the type of sound source. For marine applications, particularly for the military, the noise generated by rotating machinery is of particular interest. Not only does a rotating device (such as a propulsor) radiate sound, but the metal body to which it is attached (a submarine, torpedo, or surface vessel) acts as an even larger sound source. The present invention, because it increases the energy transferred between the propulsor and the working medium at a given angular velocity, can provide the same thrust at a lower angular velocity. In addition, with the thrust increases available using the present invention, a propeller with a smaller diameter can produce the same amount of thrust, thus lessening the propulsor volume required for a given vessel.

Nor is the invention limited to the use of stator blades to direct the fluid into a rotating cascade of lifting elements. As already pointed out, the invention includes any method by which flow is introduced to a cascade in a manner that varies a parameter of the flow relative to each lifting element in repeating cycles to cause the flow relative to each lifting element to begin separate and then reattach periodically. For example, this could involve changing the velocity and/or swirl of the flow entering the lifting element cascade. Thus, a circumferentially cyclic variation in the onset flow to the cascade could be introduced through careful tailoring of upstream duct geometry (for example, by using a non-circular duct). The same effect could be accomplished using jet blowing devices in struts upstream of the cascade directing fluid at appropriate angles varying around the rotor circumference, an upstream flow screen that varies the angle of the onset flow circumferentially, or any other device that one skilled in fluid dynamics might envision to vary in repeating cycles a parameter of the flow entering a cascade of lifting elements.

Figure 12:
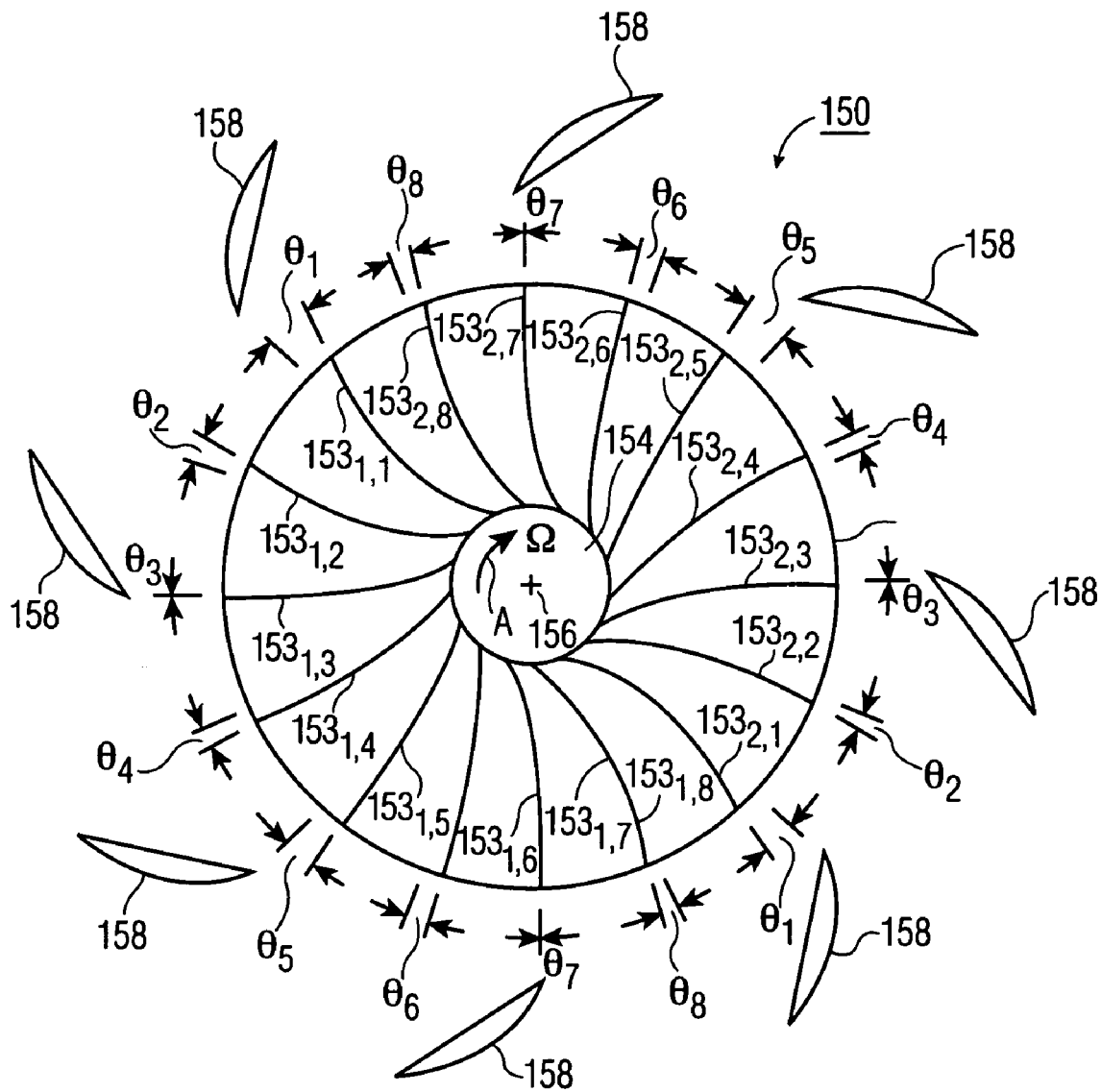
FIG. 12 depicts an alternate embodiment of the invention incorporated in a centrifugal compressor.

By way of illustration of other possible applications of the invention, the centrifugal pump illustrated in FIG. 12 is an example of an embodiment in which the cascade of lifting elements is stationary and the device for directing fluid into the cascade rotates. A centrifugal pump 150 comprises a centrifugal impeller 153 with a plurality of impeller elements $153_{M,K}$, which will be described in more detail shortly. The impeller elements are arranged around a hub 154 capable of rotating on an axis 156 in the direction of the arrow A at an angular velocity $\Omega$. As is conventional, the working fluid enters the impeller at a radially inward location near the hub 154, and the impeller elements direct the flow to the impeller outlet disposed at its periphery. The flow exits the impeller outlet and is directed into a diffuser (not shown). A cascade of lifting elements 158 is disposed around the periphery of the impeller, and each lifting element 158 has an airfoil shape. The cascade of lifting elements has an inlet into which is directed working fluid exiting the impeller outlet. A typical compressor/pump with this basic design is shown in U.S. Pat. No. 5,368,440 to Japikse et al.

In accordance with the present invention, the conventional design is altered so that the impeller device for directing fluid into the cascade inlet comprises impeller elements 153 with cyclically varying configurations arranged in M groups, each having K impeller elements. The notation in FIG. 12 corresponds to that in FIG. 3, except that M=2 and K=8 in FIG. 12. Therefore, each of impeller elements $153_{M,1}$ directs the flow toward the cascade of lifting elements 158 at an angle $\theta_1$; each of impeller elements $153_{M,2}$ directs the flow toward the cascade of lifting elements 158 at an angle $\theta_2$; each of impeller elements $153_{M,3}$ directs the flow toward the cascade of lifting elements 158 at an angle $\theta_3$; each of impeller elements $153_{M,4}$ directs the flow toward the cascade of lifting elements 158 at an angle $\theta_4$; each of impeller elements $153_{M,5}$ directs the flow toward the cascade of lifting elements 158 at an angle $\theta_5$; each of impeller elements $153_{M,6}$ directs the flow toward the cascade of lifting elements 158 at an angle $\theta_6$; each of impeller elements $153_{M,7}$ directs the flow toward the cascade of lifting elements 158 at an angle $\theta_4$; and each of impeller elements $153_{M,8}$ directs the flow toward the cascade of lifting elements 158 at an angle $\theta_8$. The exit angle $\theta$ of the impeller elements within each group M gradually changes around the periphery of the impeller; in that fashion the exit angles $\theta$ of the different impeller elements 153 correspond to the turning angles $\theta$ of the different stator in FIG. 3. In a centrifugal pump or compressor the pressure rise can be enhanced by increasing the lift provided by the cascade of lifting elements 158. Accordingly, the invention provides angles $\theta_1$ to $\theta_8$, chosen such that each lifting element 158 experiences flow cycling like that depicted in FIG. 4, in which the flow repeatedly begins to separate from each lifting element and then reattaches.

The above describes how the present invention in its myriad forms can assume different embodiments in accordance with the specific application under consideration.

SUMMARY

Those skilled in the art will readily recognize that the invention has application to a wide variety of apparatus. Some of them are fans, compressors, turbines, pumps, marine propulsors, and propellers. Applications for such apparatus include military submarines, torpedoes, unmanned underwater vehicles, air handling systems, high performance aircraft propellers, turbochargers, turbines, and other turbomachinery. It is particularly well adapted for implementation in tunnel thrusters such as those used on large ships for maneuvering in close spaces without a tugboat. These devices comprise tunnels through the ship's hull disposed to provide thrust transverse to the ship's axis. The present invention offers the option of placing a stator in the duct upstream of the thruster's propeller element, which can increase the available thrust or, conversely, enable use of a smaller diameter tunnel. The same application can be implemented on ships' podded thrusters, which operate similar to tunnel thrusters, but are separate structures the orientation of which can be changed to vector the thrust in desired directions.

In that connection, only selected preferred embodiments of the invention have been depicted and described, and it will be understood that various changes and modifications can be made other than those specifically mentioned above without departing from the spirit and scope of the invention, which is defined solely by the claims that follow.

What is claimed is:

1. An apparatus for changing the pressure of a fluid flow, the apparatus comprising:
   a plurality of lifting elements spaced from each other in a cascade, each said lifting element having an airfoil cross-section that provides lift as fluid travels relative thereto; and
   a device for directing the fluid into an inlet of said cascade,
   wherein said device varies a parameter of the flow relative to each said lifting element in repeating cycles to cause the flow relative to each lifting element to begin to separate from said lifting element and then reattach thereto during each said cycle.

2. An apparatus as in claim 1, wherein said cascade comprises a first axial flow impeller and said lifting elements comprise a plurality of impeller blades arranged around a hub capable of rotating on an axis.

3. An apparatus as in claim 2, wherein:
   said device comprises a stator with a plurality of stator blades arranged around said axis upstream of said impeller; and
   said parameter is a flow angle at which the flow is directed to said impeller, each said stator blade being oriented at a predetermined turning angle for circumferentially varying said flow angle above and below an angle of attack at which each said lifting element experiences steady-state stall.

4. An apparatus as in claim 2, wherein:
   said device includes a second axial flow impeller having a plurality of impeller blades upstream of said first impeller and mounted for rotation on said axis in a direction opposite the direction of rotation of said first impeller; and
   said parameter is a flow angle at which the flow is directed to said first impeller, each said blade of said second impeller being oriented at a predetermined turning angle for circumferentially varying said flow angle above and below an angle of attack at which each said lifting element experiences steady-state stall.

5. An apparatus as in claim 1, wherein:
   said lifting elements are arranged around a hub capable of rotating on an axis;
   said device includes a second plurality of lifting elements having an airfoil cross-section arranged in a second cascade around said hub; and each said airfoil in said second cascade has a predetermined geometric property that varies circumferentially around said second cascade, said property including at least one of lifting element turning angle, airfoil configuration, and distance between adjacent said lifting elements.

6. An apparatus as in claim 5, wherein:
said first cascade includes an axial flow impeller and said lifting elements of said first cascade comprise a plurality of impeller blades ;
said second cascade includes at least one of (i) a stator with a plurality of stationary blades and (ii) a second axial flow impeller having a plurality of impeller blades mounted for rotation on said axis in a direction opposite the direction of rotation of said first impeller; and
said parameter is a flow angle at which the flow is directed to said first impeller, each said blade of said second cascade being oriented at a predetermined exit angle for circumferentially varying said flow angle above and below an angle of attack at which each said lifting element experiences steady-state stall.

7. An apparatus as in claim 6, wherein:
said first axial flow impeller comprises a propeller for generating thrust used to propel a body through said fluid; and
said geometric property cyclically varies in a predetermined manner to minimize variations in thrust in the direction of said axis and moments transverse to said axis during each revolution of said first impeller.

8. An apparatus as in claim 7, wherein:
said propeller comprises 2MJ propeller blades, M being an integer greater than 1 and J being an integer greater than or equal to 1; and
said second cascade introduces M cyclical variations in said flow angle around the circumference of said propeller.

9. An apparatus as in claim 8, wherein said propellers blades are skewed.

10. An apparatus as in claim 8, wherein said first axial flow impeller comprises a rotor of a device selected from the group comprising a marine propulsor and a marine propulsor enclosed in a duct with said second cascade.

11. An apparatus as in claim 5, wherein:
said first cascade comprises an axial flow rotor of turbomachinery selected from the group comprising a fan of a turbofan jet engine, a compressor of a gas turbine;
said second cascade includes a stator with a plurality of stationary blades; and
said parameter is a flow angle at which the flow is directed to said rotor, each said stationary blade being oriented at a predetermined exit angle for circumferentially varying said flow angle above and below an angle of attack at which each said lifting element of said first cascade experiences steady-state stall.

12. An apparatus as in claim 5, wherein said device includes a plurality of stages, wherein:
each said stage includes said first cascade and said second cascade, said first cascade including an axial flow impeller with said lifting elements comprising a plurality of impeller blades and said second cascade including a stator comprising a plurality of stationary lifting elements; and
flow exiting said outlet of said axial-flow impeller of one said stage is directed to said stator of a stage downstream of said one stage.

13. An apparatus as in claim 1, wherein:
said device includes a second plurality of lifting elements having an airfoil cross-section arranged in a second cascade around an axis; and
each said airfoil in said second cascade has a predetermined geometric property that varies circumferentially around said second cascade to vary said flow parameter, said geometric property of each said airfoil being adjustable to optimize the change in pressure provided by the apparatus at each of different operating conditions of said apparatus.

14. A method of controlling the pressure of a fluid flow, the method comprising:
providing a plurality of lifting elements spaced from each other in a cascade, each said lifting element having an airfoil cross-section that provides lift as fluid travels relative thereto;
providing a device for directing the fluid into an inlet of said cascade; and
varying a parameter of the flow directed into said inlet relative to each said lifting element in repeating cycles to cause the flow relative to each lifting element to begin to separate from said lifting element and then reattach thereto during each said cycle.

15. A method as in claim 14, wherein said parameter is at least one of the magnitude of the velocity of the flow entering said inlet of said cascade, the direction of the velocity of the flow entering said inlet of said cascade, and the swirl in the flow entering said inlet of said cascade.

16. A method as in claim 14, wherein:
said cascade comprises an axial flow impeller and said lifting elements comprise a plurality of impeller blades arranged around a hub capable of rotating on an axis; and
the number of said cycles is selected to provide a reduced frequency k from 0.1 to a value on the order of magnitude of 1 for all sections of each said blade over a predetermined operating range of said impeller, k being defined as follows:

$$k = \left(\frac{M\Omega}{V}\right)\left(\frac{c}{2}\right)$$

where k=reduced frequency, M is said number of said cycles per revolution of said impeller, $\Omega$ is the impeller angular velocity in radians/sec., c is the chord length in feet of the impeller blade airfoil section being considered, and V is the average total velocity in ft./sec. of the air flow approaching the blade.

17. A method as in claim 16, wherein:
said directing step is implemented by a stator with a plurality of stator blades having airfoil cross-sections arranged around said axis upstream of said impeller;
said impeller blades have a predetermined cross-section that exhibits steady aerodynamic stall when flow approaches said impeller blades at an angle above a steady-state stall angle; and
said parameter is a flow angle at which the flow is directed to said impeller, each said stator blade being oriented at a predetermined turning angle that varies said flow angle circumferentially around said axis from 10° below to 20° above said steady-state stall angle.

18. A method as in claim 17, wherein said stator blades are oriented at predetermined turning angles that vary said flow angle circumferentially around said axis from 5° below to 15° above said steady-state stall angle.

19. A method as in claim 17, further comprising:

setting k to the order of magnitude of 1, selecting an impeller geometry to set c and V, and selecting a design point for said impeller to set $\Omega$;

calculating M according to the equation $M=(2Vk)/(\Omega c)$; and rounding M to the nearest integer.

* * * * *